United States Patent [19]

Bingley et al.

[11] Patent Number: 5,289,998
[45] Date of Patent: Mar. 1, 1994

[54] SOLAR ARRAY OUTPUT REGULATOR USING VARIABLE LIGHT TRANSMISSION

[75] Inventors: John D. Bingley; Patrick J. Callen, both of Yardley, Pa.

[73] Assignee: General Electric Co., East Windsor, N.J.

[21] Appl. No.: 776,028

[22] Filed: Oct. 15, 1991

[51] Int. Cl.⁵ .................................................. B64G 1/44
[52] U.S. Cl. ............................. 244/173; 244/158 R; 244/168; 323/906; 136/292
[58] Field of Search ............... 323/906; 136/292, 293, 136/246; 244/169, 173, 158 R

[56] References Cited

U.S. PATENT DOCUMENTS

| | | | |
|---|---|---|---|
| 3,740,636 | 6/1973 | Hogrefe et al. | 244/173 X |
| 4,390,940 | 6/1983 | Corbefin et al. | 323/906 X |
| 4,404,472 | 9/1983 | Steigerwald | 323/906 X |
| 4,573,214 | 2/1986 | Mooradian | 343/DIG. 2 |
| 4,604,567 | 8/1986 | Chetty | 323/906 |
| 4,697,136 | 9/1987 | Ishikawa | 323/906 X |
| 4,728,878 | 7/1992 | Anthony | 136/246 X |

OTHER PUBLICATIONS

Richard A. Perez, *Electronic Display Devices*, Tab Professional & Reference Books, 1988, Chapter 6, "Liquid Crystal Displays (LCD)", pp. 203-255.
"Crystallizing LCD Types," *Electronic Design*, May 28, 1987, p. 90.
"Tektronix Builds a Brighter, Crisper LCD," *Electronics*, May 28, 1987, pp. 61-62.
Richard L. Macklin, "Make-up of Liquid Crystals," *1980 The Optical Industry and Systems Purchasing Directory*, pp. B-155 through B-158.
"Negative Guest-Host Dichroic LCD," Hamlin appli7 cation note, pp. 1 and 3.

*Primary Examiner*—Joseph F. Peters, Jr.
*Assistant Examiner*—Christopher P. Ellis
*Attorney, Agent, or Firm*—William H. Meise; Stephen A. Young; Clement A. Berard

[57] ABSTRACT

A solar cell voltage regulating arrangement which is particularly advantageous for use in spacecraft includes a light valve such as a liquid crystal cell disposed before the solar cell, to thereby controllably vary the light transmission to the solar cell. A control arrangement varies the transmission of the liquid crystal to control the output voltage.

8 Claims, 3 Drawing Sheets

SOLAR ARRAY OUTPUT REGULATOR USING VARIABLE LIGHT TRANSMISSION

BACKGROUND OF THE INVENTION

This invention relates to a control apparatus for the output voltage or current of a solar cell or array of solar cells, and particularly relates to those in which variable light transmissive devices, such as liquid crystal devices, are used as control regulators.

Solar cells and solar arrays are in widespread use for generation of electrical power, especially in remote or inaccessible locations. In particular, solar cell arrays are used to provide electrical power on spacecraft. FIG. 1 illustrates, in highly simplified form, a prior art spacecraft 10 including a body 12 and a pair of solar panels or solar cell arrays 14a, 14b mounted on corresponding booms 16a, 1b. Booms 16a and 16b may be arranged on bearings, such as bearing 18b, to allow for rotation of the booms for positioning the solar cell arrays.

FIG. 2 is a simplified block diagram of a prior art arrangement for controlling the output voltage of the solar arrays of a spacecraft. In FIG. 2, the solar panels 14a and 14b of FIG. 1 are illustrated together as a single block designated 14. When sunlight falls on solar panel 14 of FIG. 2, an electrical voltage is generated between terminals 20 and 22, which voltage can be used to energize a utilization apparatus, illustrated as a resistor 24. Electrical current flows under the impetus of the solar panel voltage from terminal 20, through a bus conductor 26 and slip rings 28 to load 24. Slip rings 28 are provided to allow a continuous electrical path notwithstanding the rotation of booms 16 relative to body 12 of the spacecraft of FIG. 1. The return path for current from load 24 to solar panel 14 is by way of another slip ring 28b and, as is well known to those skilled in the art, another conductor, illustrated in FIG. 2 as the common ground on the spacecraft.

In FIG. 2a, a resistor 30 and a zener or avalanche diode 32 form a voltage divider 33 which is coupled between bus 26 and ground, for generating reference voltage at node 34. A controller illustrated as a block 36 includes an amplifier (not illustrated) which compares a sample of the voltage from bus 26 with the reference voltage at node 34, and produces an error signal which is applied by way of a conductor 90 to the control input terminal of a shunt load, illustrated as a block 38. Shunt load 38 is coupled by a slip ring 28c across a portion of the solar array. Shunt load 38 responds to the error voltage by varying its conduction, to thereby interact with the current producing ability of solar panel 14 in a manner which reduces the voltage on bus 26 toward the value established by control block 36. Such schemes are notoriously well known and are but one form of a degenerative or negative feedback control system.

FIG. 2b illustrates a portion of solar panel 14. In FIG. 2b, solar panel 14 includes a plurality of arrayed solar cells 40a, 40b, 40c . . . , each of which has an upper surface 41 and a lower surface. Upper surface 41 includes a light input port or aperture, which is merely a light-sensitive portion of surface 41. When light, illustrated by a photon symbol 46, "enters" the aperture, a voltage is generated between upper surface 41 and the lower surface of each solar cell 40. Conductors (not illustrated) associated with the upper and lower surfaces of each solar cell provide ohmic contact between interconnection conductors 42 and the solar cells. Each conductor 42 of FIG. 2b connects the top surface of one solar cell to the bottom surface of the adjoining solar cell, thereby forming an electrical series connection by which the individual voltages produced by each cell can be added to produce a larger output voltage. Parallel connections of a number of such series strings may be made to increase the current output capability of the solar panel. Upper surface 41 of each solar cell 40 is protected by a coverglass 44, as for example upper surface 41 of solar cell 40b is protected by a coverglass 44b. The coverglass may itself have a conductive coating on its outer surface (the surface remote from the solar cell) to reduce arc discharges.

A disadvantage of the scheme of FIG. 2 lies in the thermal problems of spacecraft and the high power dissipation of shunt load 38 of FIG. 2 during operation. In a particular spacecraft under design, a solar array is used in which 90 solar cells are connected in series, each of which produces about 0.5 volts at maximum power. A sufficient number of cells are parallelled to produce an output current of 40 amperes (A), and shunt regulation is used in conjunction with 58 of the 90 series-connected cells to maintain a desired bus voltage of 28 volts. The 32 series cells which are not shunt regulated produce a maximum of 16 volts, whereupon the voltage across the 58 cells being regulated must be reduced from as much as 29 volts to 12 volts to meet the desired bus voltage. Assuming that the maximum current being shunted is 30 A, the total shunt power is 30 A multiplied by 12 volts, which equals 360 watts. In the above-mentioned spacecraft design, dissipation of this amount of heat requires that the shunt circuits be mounted on heat sink brackets associated with the solar array. The shunt elements and the associated brackets in this particular instance weigh approximately 22 lbs. It is desirable to reduce the high thermal dissipation in a shunt load, and to eliminate the weight associated with such a control scheme.

SUMMARY OF THE INVENTION

A light-operated electric generator includes a light admitting aperture and terminals at which a direct voltage is generated when light enters the aperture. A suitable generator is a silicon solar cell or an array of interconnected solar cells. A source of reference voltage is coupled to a first terminal of an amplifier, and the other terminal of the amplifier is coupled to a sample of the voltage produced by the generator. The amplifier generates an error signal representing the difference between the direct voltage generated by the generator and the desired voltage. A controllable light transmission arrangement is located before the light admitting aperture or apertures of the generator, to thereby control all or a portion of the light entering the aperture. The controllable light transmitting arrangement includes electrical energization terminals, and is adapted for allowing light to enter the light admitting aperture of the generator in a first electrical energization state, and for preventing light from entering the light admitting aperture of the generator in a second electrical energization state. A feedback coupling arrangement is connected between the amplifier output and the electrical energization terminals of the controllable light transmitting arrangement, for translating the error signal to the variable light transmitting device in a degenerative or negative feedback manner, whereby a closed feedback loop is formed which tends to maintain the direct voltage near the desired voltage. In a particular embodiment of the invention, the controllable light transmitting arrangement is a plurality of liquid crystal cells regulating a like plurality of solar cells. In a particular embodiment, a spacecraft includes a plurality of such solar cells and a liquid crystal array associated with a solar panel, and the error signal is converted into an alternating square wave of variable amplitude for energizing the liquid crystal cells.

DESCRIPTION OF THE DRAWINGS

FIG. 2b illustrates details of a portion of the solar panel of FIG. 2a;

FIG. 3b illustrates details of a portion of the solar panel of FIG. 3a.

DESCRIPTION OF THE INVENTION

Figure 1:
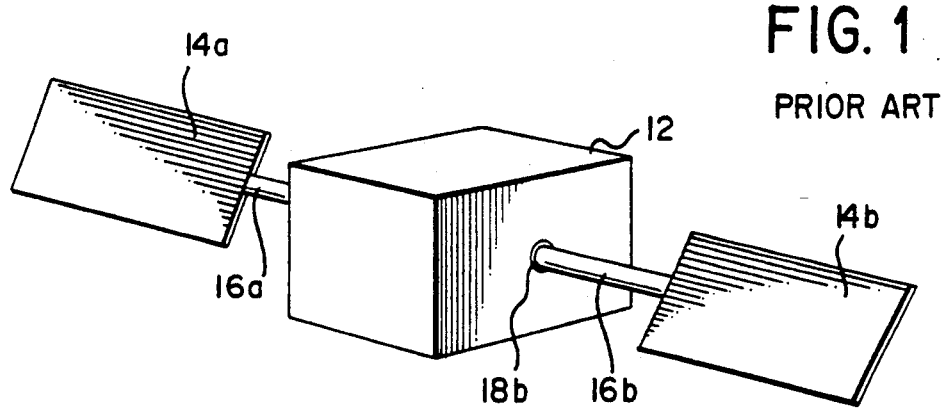
FIG. 1 is a simplified representation of a spacecraft including a body and a pair of solar panels.
Figure 2A:
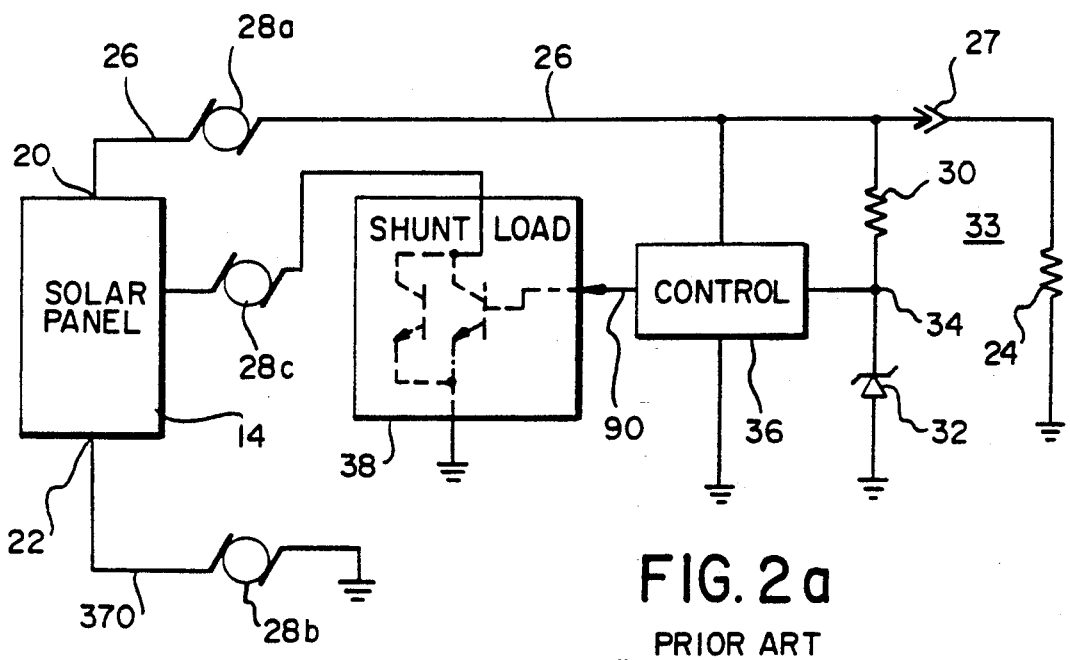
FIG. 2a is a simplified block diagram of a prior art regulator for the electrical system of the spacecraft of FIG. 1.
Figure 2B:
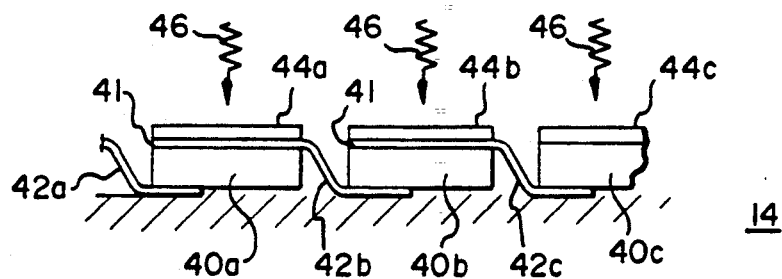
Figure 3A:
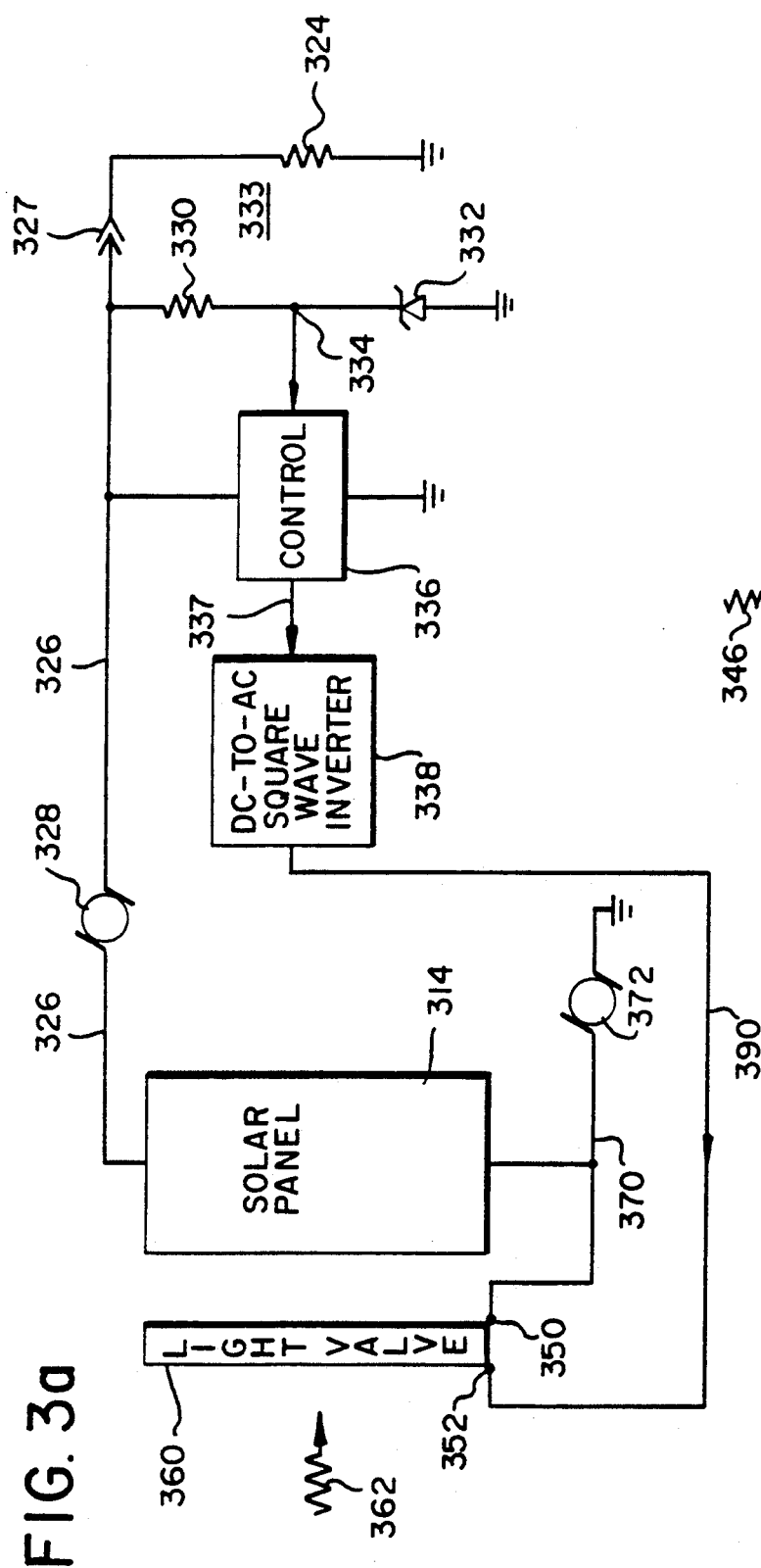
FIG. 3a is a simplified block diagram of a regulator in accordance with the invention.
Figure 3B:
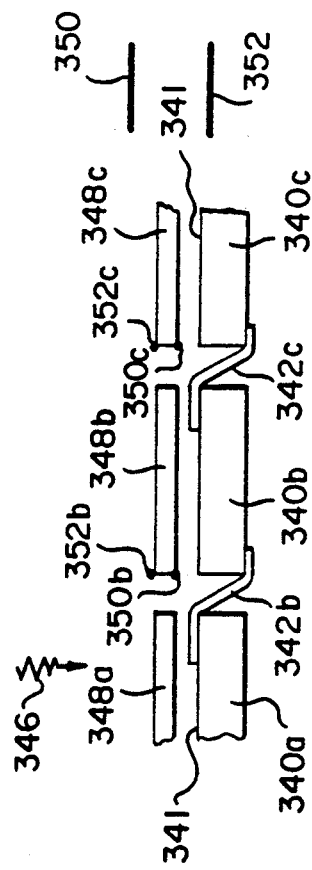

FIG. 3a is a simplified block diagram of a control system in accordance with the invention. In FIG. 3a, a solar panel 314 is made up of interconnected solar cells 340 as illustrated in FIG. 3b. In FIG. 3b, a plurality of solar cells 340a, 340b, 340c . . . are arrayed and electrically connected in series by electrical conductors 342b, 342c . . . in a manner similar to that described in conjunction with FIG. 2b. In FIG. 3b, each solar cell 340 has a liquid crystal cell 348 located before or in front of its light aperture 341, instead of a coverglass as in FIG. 2b. For example, a liquid crystal cell 348c is located above surface 341 of solar cell 340c. The physical mounting arrangements are not illustrated. Ideally, the solar cell apertures and the light-controlling paths of the liquid crystal cells are in registry, between light 346 and light aperture 341, and each light-controlling path substantially covers the associated light aperture. Each liquid crystal cell includes a pair 350x, 352x of electrodes, where x is an index letter representing the particular cell. Control voltages may be applied to electrodes 350, 352 of each solar cell for controlling the light transmission therethrough. A pair of bus connectors 350, 352 are connected to electrodes 350x, 352x, respectively, of each liquid crystal cell, so that all the liquid crystal cells are electrically driven in parallel, or energized by the same voltage at the same time.

In FIG. 3a, voltage produced by solar panel 314 is applied by way of a conductor 370, slip ring 372, the ground connection and bus 326, slip rings 328 and connector 327 to a load or utilization apparatus, illustrated as a resistor 324. A resistor 330 in conjunction with a zener or avalanche diode 332 forms a voltage divider 333 coupled between bus 326 and ground, which produces a reference voltage at a node 334. The reference voltage is applied to a control circuit illustrated as a block 336, which compares the reference voltage with a sample of the voltage on bus 326, and generates an error signal representative of the difference therebetween on a conductor 337. The error signal varies in amplitude in response to deviation of the bus voltage away from the desired value. The error signal is applied to a DC-to-AC square wave inverter illustrated as a block 338. Inverter 338 "chops" the error signal to produce a variable amplitude symmetrical alternating square wave on a conductor 390. A light valve illustrated as 360 is illustrated as being juxtaposed with solar panel 314, in a position between the solar panel and light illustrated by a photon symbol 362. Light valve 360 includes an array of liquid crystal cells, each located before or in front of the light admitting aperture of the corresponding solar cell, as described in conjunction with FIG. 3b.

Many types of liquid crystal cells are known. Basic liquid crystal cells, however, can be said to have two conditions, depending upon their electrical energization. In a first state, they are transparent, thereby allowing light to pass therethrough. This is a transmissive condition. In a second state, they do not allow light to pass, but instead either absorb or reflect the light. This is a non-transmissive or light-blocking condition. The transition between the transmissive and non-transmissive states is gradual, so a continuous variation of light transmission can be obtained in response to the control signal.

In operation of the arrangement of FIG. 3a, control block 336 generates an error voltage representative of the difference between the desired voltage on bus 326 and the actual voltage. The error signal, if not within the correct voltage range for driving electrodes 350 and 352 of light valve 360, can be amplified or attenuated to the correct value and applied directly to the liquid crystal, without conversion to a square wave. However, at the present state of the art, the flow of direct current through the liquid crystal material tends to degrade the material, and conversion to a "square" wave alternating voltage is desirable. The peak-to-peak amplitude of the square wave varies in response to the error signal. The variable amplitude square wave is applied from inverter 338 to light valve 360 poled to reduce the transmission of light therethrough with increases in the bus voltage, to thereby form a degenerative feedback loop by which the voltage is stabilized. The poling of the control signal causes the p-p amplitude of the square wave to either increase or decrease in response to increases in bus voltage, as required by the particular control characteristics of the light valve.

Figure 4:
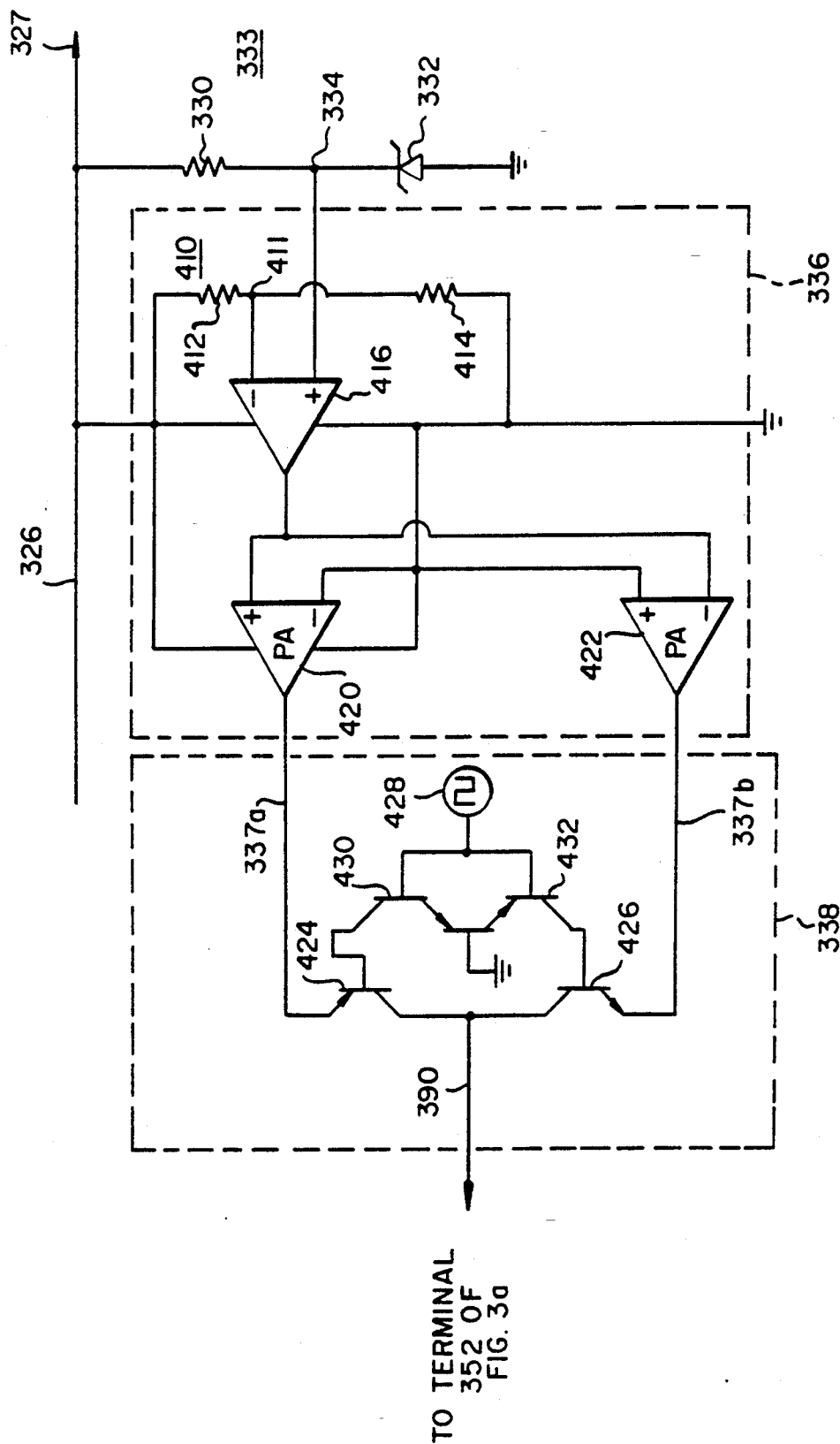
FIG. 4 is a simplified schematic diagram of a control circuit and DC-to-AC square wave inverter which may be used in conjunction with liquid crystals.

FIG. 4 illustrates details of portions of the arrangement of FIG. 3a. In FIG. 4, elements corresponding to those of FIG. 3a are designated by the same reference numerals. In FIG. 4, control circuit 336 includes a voltage divider 410 with resistors 412 and 414 coupled between bus 326 and ground. A sample of the bus voltage appears at node 411. A first high gain amplifier 416 has its inverting (−) input connected to node 411 and its non-inverting (+) input connected to node 334 of voltage divider 333, and produces an error signal representative of the difference between the reference voltage and the sample of the bus voltage. A voltage-following differential power amplifier 420 connected for noninverting operation amplifies the error signal, and boosts the current capability of amplifier 416, and a corresponding amplifier 422 connected for inverting operation amplifies the error signal with the same gain as the noninverting amplifier 420 and also boosts the output capability of amplifier 416, to produce at their outputs a pair of error signals of mutually opposite polarity and equal amplitude relative to ground. Mutually opposite-polarity portions of error voltage are applied over conductors 337a and 337b to the emitters of bipolar switching transistors 424, 426 respectively. The bases of transistors 424 and 426 are coupled to the collectors of bipolar transistors 430 and 432 whose emitters are connected to ground. This arrangement allows a ground referenced square wave source 428 to interface with the bases of transistors 430 and 432 to effect proper switching. Square waves produced by source 428 alternately drive one pair of transistors 424; 430 and 426; 432 into conduction and non-conduction, respectively, and then vice versa. When switch transistors 424 and 430 conduct and switch transistors 426 and 432 do not conduct, the output voltage from power amplifier 420 is coupled to conductor 390, and when switch 426 and 432 conduct and 424 and 430 do not conduct, the equal-and-opposite voltage output of power amplifier 422 is coupled to conductor 390. Thus, a variable amplitude, symmetrical square wave is generated for application over conductor 390 to the liquid crystal array.

At the present state of liquid crystal technology, the amount of light transmission can be varied by about 15/1 to 20/1, and the voltage required to effect this change is about 0 to 15 volts AC peak-to-peak.

The power dissipated by a liquid crystal cell, when energized by an AC voltage, varies from one to 300 microwatts per square centimeter, depending upon the type of cell and its construction. Taking 150 microwatts per centimeter as an average, and taking the array area to be in the vicinity of 108,000 square centimeters, the total power required to activate the liquid crystal array is about 16 watts. This is much less than the power dissipated by a shunt regulator, thereby easing the thermal management problem. Sixteen watts is easily dissipated to space directly from the liquid crystal cells. Also, there is no additional weight involved in using the liquid crystal cells because they replace the existing solar cell cover glass. This results, in the abovementioned example, in a 221b weight saving because of the elimination of the shunt circuits. Also, weight and complexity can be saved by the elimination of high current carrying slip rings for the shunt regulator connection. These are replaced by fewer low current sliprings for the liquid crystal control voltage.

At the present state of the art, liquid crystal material tends to increase in viscosity as temperature decreases, and the response time within which the liquid crystal modules can change their orientation increases. This may tend to slow down the control loop. Temperatures of the solar panel can drop to as much as −110° C. in the Earth's shadow. The response time of the loop may be very slow, or the liquid crystal material may freeze. However, since no light falls on the solar cell under these conditions, no control is needed. Heaters may be used to prevent damage to the liquid crystals under these conditions, if desirable.

At high temperatures, the molecules of the liquid crystal material become disoriented from their aligned positions, which tends t reduce the transmission of light. Thus, light transmission, and therefore maximum output voltage, tends to be reduced even in the absence of control signal at high temperatures, which is ordinarily the condition in which maximum sunlight reaches the solar panel. This provides "fail safe" type of operation.

Other embodiments of the invention will be apparent to those skilled in the art. For example, the liquid crystal cells may be connected in series-parallel as well as in parallel, to change the energizing voltage range.

What is claimed is:

1. A spacecraft comprising:
light activated voltage generating means including a light admitting aperture, and also including terminals at which a direct voltage is generated when light enters said aperture;
electrical utilization means coupled to said terminals;
a source of reference voltage;
amplifier means coupled to said terminals and to said source of reference voltage for generating an error signal representing the difference between said direct voltage and a desired voltage;
controllable light transmitting means located before said light admitting aperture, said controllable light transmitting means including electrical energization terminals, and being adapted, in a first electrical energization state, for allowing light to enter said light admitting aperture, and, in a second electrical energization state for preventing light from entering said light admitting aperture; and
feedback coupling means coupled to said amplifier means and to said electrical energization terminals of said controllable light transmitting means, for translating said error signal to said variable light transmitting means in a degenerative manner, to form a closed feedback loop which tends to maintain said direct voltage near said desired voltage.

2. A spacecraft according to claim 1, wherein said variable light transmitting means comprises a liquid crystal.

3. A spacecraft according to claim 2, wherein:
said amplifier means includes direct voltage differential amplifying means, whereby said error signal is a direct voltage; and
said feedback coupling means comprises switch means coupled to said amplifier means for chopping said direct voltage error signal to form an alternating voltage.

4. A light-to-electricity control system, comprising:
light activated voltage generating means including a light admitting aperture, and also including terminals at which a direct voltage is generated in response to light entering said aperture;
liquid crystal light transmission control means disposed before said light admitting aperture, said liquid crystal light transmission control means including electrical control terminals; and
feedback means coupled to said terminals of said voltage generating means and to said electrical control terminals of said light transmission control means for forming a degenerative feedback loop for control of said direct voltage.

5. A system according to claim 4, wherein said feedback means comprises a direct-voltage to variable-amplitude alternating voltage inverter.

6. A method for generating a controlled direct voltage, comprising the steps of:
passing light through a variable-transmission liquid crystal control path to form controllably attenuated light;
applying said controllably attenuated light to a light-to-electric conversion device for generating a direct voltage which depends upon the amplitude of said controllably attenuated light;
generating a reference voltage;
comparing at least a portion of said direct voltage with said reference voltage to generate an error signal representative of the difference therebetween; and
applying said error signal to said variable-transmission liquid crystal for changing the transmissive properties of said control path in a degenerative feedback manner for control of said direct voltage.

7. A method according to claim 6, in which said step of applying said error signal includes the step of generating an alternating voltage, the amplitude of which varies in response to that of said error signal.

8. A method according to claim 7, wherein said step of generating an alternating voltage includes the step of generating said alternating voltage with a peak-to-peak amplitude which is proportional to said error signal.

* * * * *